Jan. 9, 1945.  R. O. PALMER ET AL  2,366,870
PROTECTIVE DEVICE
Filed June 3, 1941
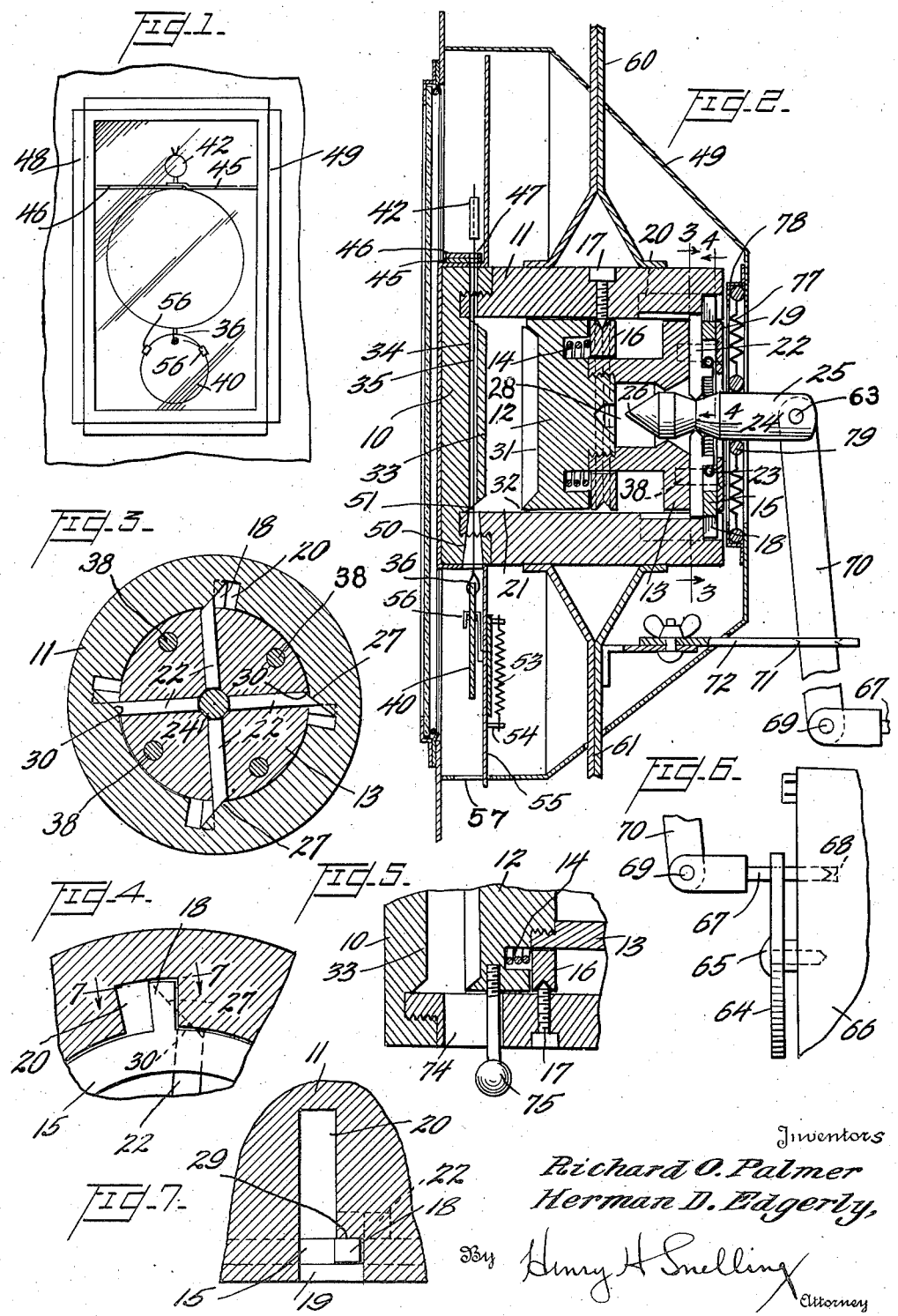
Inventors
Richard O. Palmer
Herman D. Edgerly,
By Henry H. Snelling
Attorney Patented Jan. 9, 1945

2,366,870

UNITED STATES PATENT OFFICE 2,366,870

PROTECTIVE DEVICE

Richard O. Palmer, Worcester, Mass., and Herman D. Edgerly, Plymouth, N. H.

Application June 3, 1941, Serial No. 396,462

12 Claims. (Cl. 140—145)

This invention relates to protective devices for measuring instruments and has for its principal object the provision of means for preventing unauthorized tampering with the meter adjustment of a dispensing mechanism such as a gasoline pump.

A further object of the invention is to provide a shearing mechanism adapted to sever a wire holding a visible object so as to remove such visible object thereby to indicate that a measuring device has been tampered with, and that possibly its accuracy has been harmed.

A still further object of the invention lies in the broad provision of a visible indication which serves as an assurance that a measuring device which has been checked and which has been found satisfactory, as for example, by an official inspector of weights and measures, is still correct, for any tampering with the adjustment will cause the disappearance of such assurance of correctness. While my device will be described as applied to a gasoline dispensing pump it is apparent that the mechanism has much wider use and that the specific illustration is merely for clarity of description.

There are on the market a considerable number of volume delivering pumps and in these various pumps some adjustment is always made to insure that a certain quantity of liquid has been dispensed when the indicator registers that certain figure, as for example, ten gallons. It is well known that dishonest dealers sometimes alter the adjustment of the pump after the government inspector has fixed the seal of correctness and thus such dealer may deliver a smaller quantity than ten gallons when the indicator shows that this amount should have been delivered. This invention seeks to prevent such unauthorized tampering with the meter adjustment irrespective of what type adjustment may be used.

In the drawing:

Figure 1 is a front elevation.

Figure 2 is a central vertical section.

Figure 3 is a vertical section on line 3—3 of Figure 2.

Figure 4 is a section on line 4—4 of Figure 2.

Figures 5, 6 and 7 show details.

The housing member of my device is a two-piece structure, 10 being the forward portion or head to which is shown threaded the rear portion 11 which is a cylindrical casing. The two parts obviously may be a single casting but it has been found convenient to make them as illustrated. This housing member forms a guide or cylinder for the shear pin which has longitudinal movement throughout the bore of the casing and also has a small rotational movement for a purpose later to be described. A spring 14 confined between the forward shear member 12 and a rotatable ring or stop member 16 held against axial movement by the four screws 17, urges the shear assembly forwardly but such movement is normally resisted by a disk 15 which forms a part of the shear pin assembly and is provided with a series of teeth 18, here shown as four in number. An annular cap 19, also a portion of the shear pin assembly is held in place by a plurality of screws 38 which secure together the annular cap, the disk 15 with its teeth, and the rear member 13 of the shear pin.

A slight rotation of the shear pin moves the teeth 18 into registry with the longitudinal grooves 20 equal in number to the number of teeth and this permits forward movement of the shear pin assembly under urge of the spring 14 for the length of the grooves 20 which are in the rear portion of the casing. The members 12 and 13 form together a spool or carrier, the cylindrical surfaces of which fit the bore 21 in the casing. The screw connection illustrated as joining the members 12 and 13 is of material convenience for it enables the forward member 12 to be moved with respect to the member 13 so as to present a fresh cutting edge whenever desired without altering in any way the guide function of the rear member 13 with its substantially integral teeth 18.

A plurality of cam rods 22 slide freely in ways cut in the rear face of the second shear pin member 13 and are held in retracted position by a coiled circular spring 23 which surrounds small integral pins on the cam rods. This action urges the pointed inner ends of the four thrust pins into contact with the restricted neck 24 of the trigger 25. The tapered nose 26 on the trigger is convenient in aiding in forcing outwardly the cam rods so as to enable the trigger 25 to enter within the cylindrical portion or well 28 in the shearing pin. As best seen in Figure 4 the cam slopes 30 at the outward ends of the rods 22 engage correspondingly sloped walls 27 of the groove 20 at the rear end of the casing, thus forming stops 29 to engage and retain the teeth 18 and thus prevent forward movement of the shear assembly.

Should the four rods 22 be moved outwardly as by movement of the trigger 25 in either direction from the setting shown, this action would cause a slight rotative movement of the shear assembly 12—13—15—19. Such a revolving movement of the shear pin assembly carries the teeth 18 away from their retaining stops 29 and thus brings them simultaneously into registry with the free portion of the grooves 20 allowing the shear pin assembly to move the full length of the groove 20 and into engagement with the head 10.

The head portion 12 of the shear assembly has a central dished portion 31 forming a circular cutting edge 32. The head 10 carries a corresponding projection 33 forming a stop for the shear pin assembly. Vertically through the housing members 10 and 11 is fine bore 34 for reception of wire 35 loped as at 36 through a hole in the indicating device 40 and having its upper free ends joined by a lead seal 42 of the usual type. The straps 45 and 46 are pierced as at 47 to receive the wire 35. These straps are secured to the shell members 48 and 49 which prevents access to the casing 11 unless the wire 35 is removed. I find it preferable to make the entry end 50 of the small bore through the casing somewhat conical as best seen in Figure 2 to facilitate the threading of the wire 35 through the bore 34. At the lower left-hand corner of the casing in Figure 2 it will be noted that a small portion 51 of the wire 35 is exposed and this is in the path of the cutting portion 32 of the shear pin assembly. Whenever this shear pin moves to the left as seen in Figure 2, the wire 35 will be cut and the indicating device 40 will drop or be moved from position.

To facilitate the ejection of the indicating device 40 I provide a spring 53 anchored to a lug 54 on a Celluloid sheet 55 which closes the front part of the shell 48—49. The spring 53 carries a pair of fingers or hooks 56 which loosely engage the indicating device 40 and eject it through the opening 57 in the shell as soon as the wire 35 is severed. This mechanism is optional since under any ordinary circumstance the indicating device will fall by gravity through this opening 57.

The casing is supported from the gasoline pump frame in any desired manner as for example by the brackets 60 and 61 which are received in slots between the shell halves 48 and 49. The regulating device for the measuring mechanism is indicated quite diagrammatically as a wheel 64 turning about a pivot 65 in a casing 66. In the path of movement of the wheel 64 is a pin 67 fitting in a bore 68 so that whenever the pin 67 is in place in this bore the wheel 64 cannot be turned to correct or to alter the setting mechanism. The pin 67 is pivoted as at 69 to a lever 70 fulcrumed at 71 in a bracket 72 adjustably carried by the supporting strap or bracket 61.

Referring particularly to Figure 5, the casing 11 is slotted as at 74 to receive a handle 75 whereby the shear pin assembly may be rotated the slight angle necessary to bring the teeth 18 into registry with the longer portion of the slots 20 to permit slow forward movement. By means of the handle 75 the shear pin can be returned to rear position to re-set the device by rotating it the slight angle necessary to bring the teeth 18 into registry with the retaining stops 29. When the shear pin is rotated either by the handle 75 or the cam rods 22 the ring 16 rotates with it. The flexible dust protecting cover 77 is carried by an annular shelf 78 on the shell and has a central rubber ring 79 to embrace the trigger 25, thus allowing the trigger to have axial and other movements and yet prevent dust from getting within the casing which otherwise disturb the action of the device.

The operation of the device is as follows: An unauthorized person desires to change the adjustment of the calculating mechanism by turning the wheel 64. Withdrawal of pin 67 from its bore 68 turns the lever 70 about its fulcrum 71 and this withdraws the trigger 25 which is pivoted to the arm or lever 70 as at 63. Such a movement moves at least one of the four cam rods 22 outwardly from their axis. Any outward movement of these cam rods against the inward pull of spring 23 cams the shear pin assembly which can rotate slightly in the casing 11 which cannot be turned. The turning movement of the shear assembly frees the teeth 18 from engagement with their respective stops 29 and thus the spring 14 drives the shear pin sharply against the head of the housing and in so doing the cutting edge 32 shears the wire 35 at its exposed portion 51. Damage to the cutting edge is avoided by the carrier 12—13 being brought to rest against the stop ring 16, just before the projecting lugs formed by the ends of rods 22 engage the end of the grooves 20. Under action of gravity, or the spring 53 if the latter is used, the indicating device which is often a fairly large disk bearing the state seal, is discharged or falls through the opening 57 and thus the next customer will know that the device has been tampered with.

When the inspector finds it necessary to alter the setting he severs the wire 35 and makes the correction with the pin 67 out of place. He then re-places the pin 67 in its bore, moving the trigger 25 in any way needed since it is free to turn in any direction as permitted by its pivot 63. The inspector then restores the shear pin to set position by moving the handle 75 rearwardly. The indicating disk 40 is fitted with a new wire 35 and when it is passed through the shell straps 45 and 46, a new lead seal 42 is applied.

What we claim is:

1. In a device of the character described, a casing having a passageway therein for a wire suspending means to hold a member proximate to the casing, trigger mechanism, a suspended member, a shear pin slidable in the casing, and spring means for moving the shear pin to sever the suspending means of the member when the trigger mechanism is operated.

2. In combination, a casing having a longitudinal groove, a spring pressed member within the casing and having a projection slidable within the groove when in registry therewith, said projection engaging the casing at other times to prevent sliding of the member, a cam device for rotating the member to bring the projection into registry with the groove, and trigger means for operating the cam device.

3. The combination with a trigger having a restricted neck formed by opposed sloping surfaces, of a carrier, a plurality of sloping tipped cam rods slidable in the carrier and spring pressed into the trigger neck, a casing surrounding the carrier, coaxial therewith, and having cam surfaces in engagement with said cam rods, whereby longitudinal movement of the trigger will cause relative rotation of the carrier and the casing.

4. A casing having a bore to receive a soft iron wire, said bore being interrupted to expose a length of the wire, a member slidable longitudinally in the casing and having a cutting edge to sever the wire at its exposed portion, and trigger controlled means to discharge the member into wire cutting position.

5. A cylinder having a bore, a rotatable member slidable within the bore, a cutter carried by the member, a ring rotatably mounted in the bore but held against axial movement, a spring engaging the ring, and urging the member to one end of the bore, and means for moving the member about its axis to carry with it the spring and the ring.

6. A shear pin assembly including a pair of threaded members each having a cylindrical surface, a cutter carried by the assembly, a casing within which the assembly slides, a stop member carried by the casing between the two ends of the assembly, and a spring engaging the stop member and urging the assembly toward one end of the casing, so that the assembly will sever a wire or other object in the casing in the path of the cutter.

7. In a wire cutter for a protective device to prevent tampering with the meter adjustment of a gasoline dispensing pump, a movable member, locking means preventing movement of said member, a device located in a chosen position when the movable member is properly set, a wire for holding said device and mechanism associated with the locking means for cutting the wire so as to cause a change of position of the device when the locking means is moved from locking position.

8. The device of claim 7 in which the device is suspended by a wire, and the mechanism includes a sliding wire cutter and means for forcibly ejecting the device when the wire is severed.

9. The device of claim 7 in which the mechanism includes a trigger-operated sliding cutter.

10. The device of claim 7 in which the mechanism includes a trigger operated sliding cutter, and the trigger and the locking means are each pivoted to a lever fulcrumed between them.

11. The device of claim 7 in which the mechanism is largely housed in a protecting shell having a centrally pierced, flexible dust cover, and includes a trigger snugly fitting the central opening of the dust cover.

12. In a wire cutter for a protective device to prevent tampering with the meter adjustment of a gasoline pump dispensing mechanism: a hollow cylinder having a transverse bore to receive and support a wire, a spring pressed piston slidable within the cylinder and having a wire cutting edge, a trigger projecting within the piston and cylinder, and means carried partly by the piston and partly by the cylinder and engaging the trigger for releasing the piston so its spring may cause the piston to sever the wire when the trigger is moved.

RICHARD O. PALMER.
HERMAN D. EDGERLY.